May 24, 1960 W. S. BLANDING ET AL 2,937,616
DIP COATING MACHINE
Filed April 19, 1957 2 Sheets-Sheet 1

INVENTORS
WENDELL S. BLANDING
AND
STEWART A. CLAYPOOLE

BY Clarence R. Patty Jr.
ATTORNEY

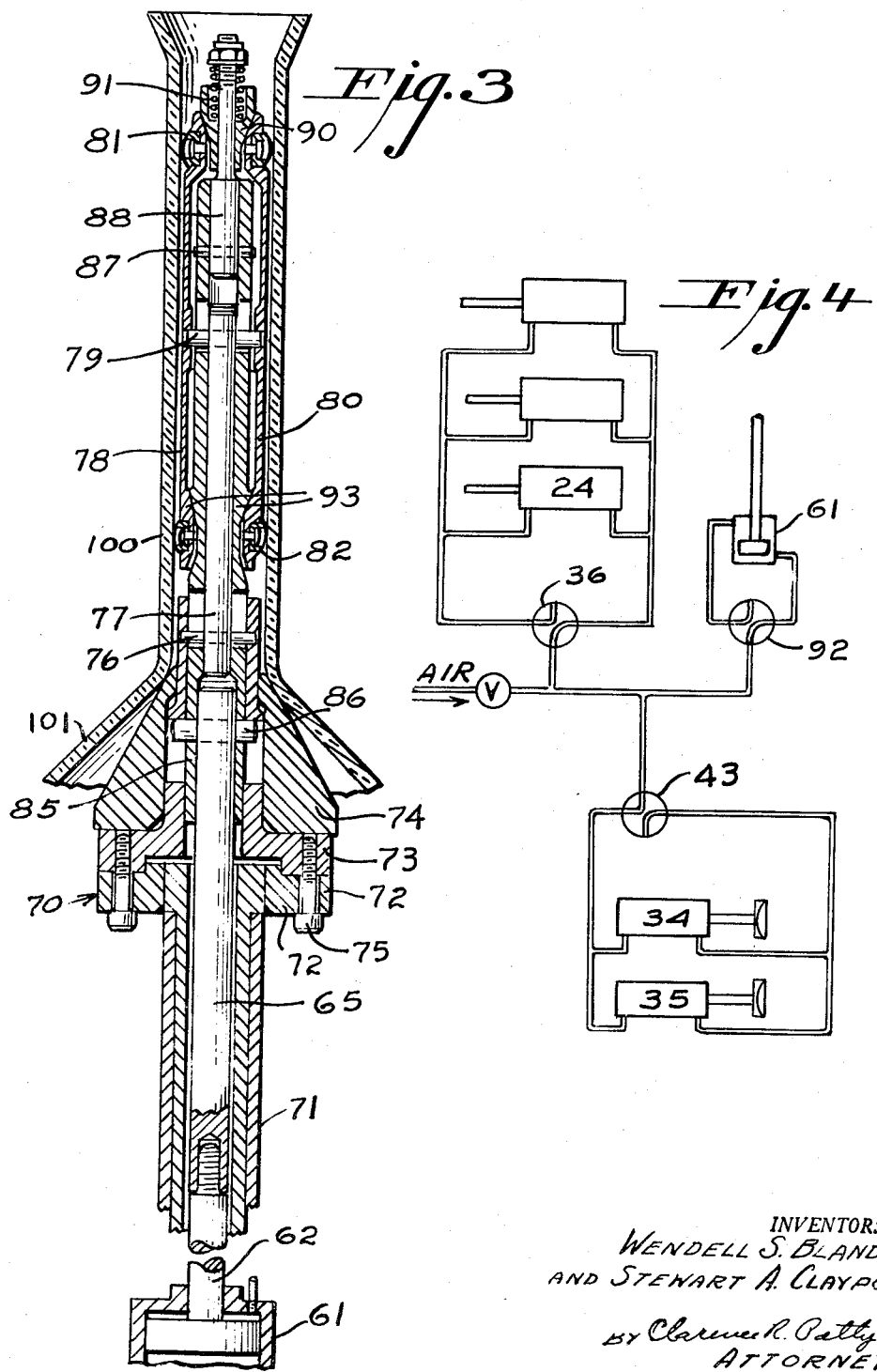

United States Patent Office 2,937,616
Patented May 24, 1960

2,937,616
DIP COATING MACHINE

Wendell S. Blanding and Stewart A. Claypoole, Painted Post, N.Y., assignors to Corning Glass Works, Corning, N.Y., a corporation of New York Filed Apr. 19, 1957, Ser. No. 653,805

9 Claims. (Cl. 118—612)

The present invention relates to coating apparatus, but is primarily concerned with the application of a solder glass frit to the mating surfaces of glass articles to be fusion sealed to one another through the medium of such frit.

By way of example the invention is hereinafter described as embodied in an apparatus suitable for applying a suspension of thermal setting sealing glass frit or the like to the mating surfaces of television picture tube panels and funnels respectively.

According to the invention an open-topped container in the form of a trough, preferably of the general outline of the surface to be coated, is provided with the suspension of frit into which the articles may be coated by dipping them thereinto. Such apparatus includes agitating means arranged in the container trough for maintaining the frit in suspension during the successive dipping of articles therein. An article having a sealing surface to be coated is arranged over such trough on suitably provided supports and is then seized by vertically movable means adapted to lower the article into suspension of frit and to withdraw it therefrom, the initially employed supports being moved out of the way following such seizure of the article.

The invention can best be described by reference to the accompanying drawings in which:

Fig. 3 is a view illustrating, in section, equipment for modifying the apparatus to dip coat the sealing surface of a funnel and showing a fragment of a funnel, in section, associated therewith.

Fig. 4 is a piping diagram of the apparatus.

Figure 1:
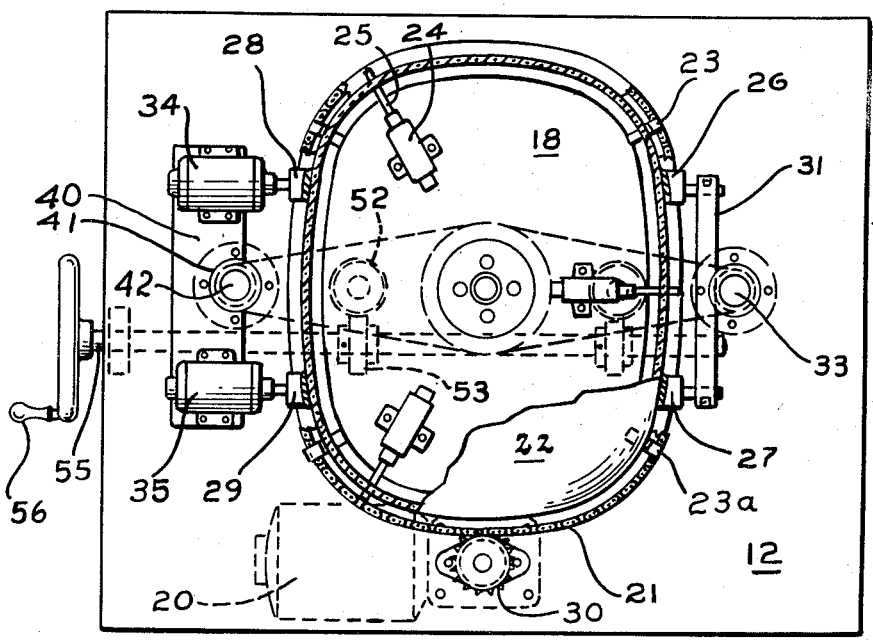
Fig. 1 is a top plan view of an apparatus embodying the invention showing certain parts broken away, and includes a sectional view of a television picture tube envelope panel associated therewith.

Referring to the drawings in detail, a slurry or suspension supply container 11 is arranged on a table top 12 having suitable vertical support members such as 13 and 14 and transverse members such as 15, 16 and 17.

Since the surfaces of the panels and funnels to be coated are, in the illustrated example, of generally rectangular outline, the container 11 is provided with an open top trough-like cavity 19 of a similar outline. A chain 21 surrounds container 11 and is adapted to be driven thereabout by a sprocket wheel 30 of a speed reduction gear driven by a motor 20. Attached to chain 21 are a number of agitator elements such as 23 and 23a projected down into the container cavity 19 and transversely along the bottom thereof. By means of this arrangement the solids of the slurry within the container may be maintained in suspension.

Arranged on the central or island region 18 of container 11 are three pneumatic units such as 24, operable by air supplied thereto via a manually operable valve 36, and having piston rods or fingers such as 25. Such fingers are projected over the container cavity 19 to provide temporary supports for an article to be coated, such for example as panel 22, and are adapted to be withdrawn after seizure of the panel between associated fixed chuck jaws 26 and 27 and companion pneumatically operable chuck jaws 28 and 29. As will be noted jaws 26 and 27 are mounted on a horizontal bar 31 carried by a sleeve 32 clamped about a vertical rod 33. The jaws 28 and 29 are similarly carried on a transverse member 40 having an associated sleeve 41 clamped about a rod 42 and are operable by means of pneumatic cylinders 34 and 35. Operating air is supplied to the cylinders 34 and 35 by a manually operable valve 43.

Rods 33 and 42 pass through suitable bearings, such as 44, and at their lower ends are secured to plates 50 and 50a through which vertical screws 51 and 51a respectively are threaded. Screws 51 and 51a at their top ends are provided with 45° gears such as 51 (Fig. 1) each in mesh with a similar 45° gear such as 53 carried by a transverse shaft 55. By means of an associated crank 56 shaft 55 can accordingly be turned to vertically move a panel that has been seized between the respective chuck jaws 26—29.

For the purpose of coating the sealing surface of a funnel the plates 50 and 50a are bridged by a plate 60 provided with a pneumatic unit 61 having a piston rod 62 projected up through a bushing 63 mounted on the transverse frame member 16. As can be readily seen in Fig. 3, the upper end rod 62 is threaded into a shaft 65 of an upstanding expanding chuck assembly 70, shown projected into the neck 100 of an associated funnel 101 whose panel mating surface (not shown) is to be coated.

Figure 2:
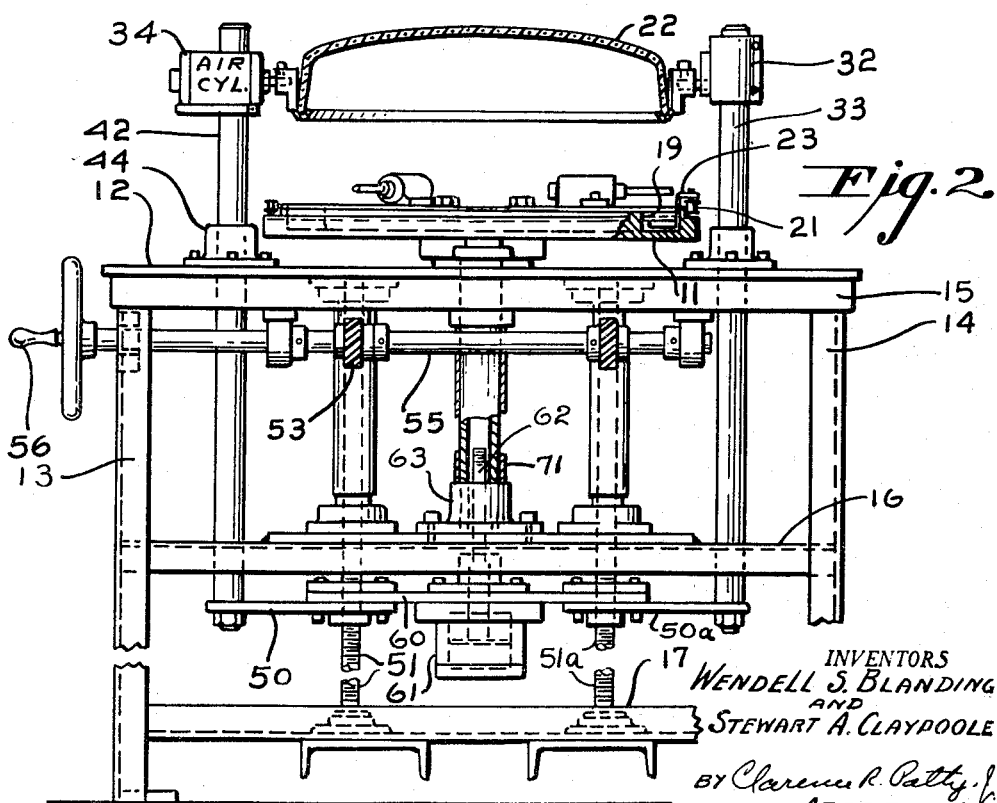
Fig. 2 is a side elevation of the apparatus and panel of Fig. 1, showing part of such apparatus and the panel in section.

The chuck assembly 70 embodies a sleeve 71 whose lower end rests on bushing 63 (Fig. 2), and whose upper end has a flange 72 on which is arranged a flanged chuck shaft supporting bushing 73 about which is arranged a conical funnel support 74 through which the bushing projects. Flange 72 and bushing 73 are clamped to one another by suitable cap screws such as 75. The chuck shaft supporting bushing 73 surrounds a chuck operating shaft 77 and is coupled thereto by a pin 76. A pin 79 passes through the upper end of shaft 77 and has supported thereon chuck jaw supports 78 and 80 each of which has an upper jaw such as 81 and a lower jaw such as 82. A tubular chuck jaw operating shaft 85 surrounds shafts 65 and 77 and is coupled to shaft 65 by a pin 86. A pin 87 passes through the upper end of shaft 85 to couple thereto an upper chuck jaw operating shaft 88. The shaft 88 carries a chuck jaw operating cam 90 which is resiliently forced between the jaw 81 and its companion jaw through the medium of a spring 91 when shaft 88 is lowered. Surfaces 93 of a cam integral with shaft 85 are provided to force the jaw 82 and its companion jaw outward as such shaft is lowered. Operating air for axially moving shaft 65 is supplied to cylinder 61 by means of a manually operable valve 92.

Operation

In the operation of the apparatus a supply of coating fluid is introduced into the cavity 19 of container 11 and the motor 20 operated to maintain the solids in such fluid in supension.

With a panel such as 22 arranged on the piston rods such as 25, valve 43 is operated to supply air to the left ends of cylinders 34 and 35 to effect the seizure of the panel 22 arranged between the chucks 26—29. By turning crank 56 the panel is lowered until it makes the necessary contact with the slurry within container cavity 19 and is then raised to its initial position, from which position it can be manually seized before its release from its chuck jaws and set aside to dry. In practice more than one coat of frit may be necessary. Under these circumstances a number of panels are usually given a frit coat in succession and later, after having been air dried, are again coated in the manner above described.

When the shape of the funnel permits, it may be seized by jaws 26—29 and handled as a panel. When the funnel shape does not permit use of such jaws the assembly is modified as illustrated and described with reference to Fig. 3. With a funnel such as 101 arranged over the chuck assembly 70 such funnel rests on the funnel support 74 and is maintained with its sealing surface in a horizontal plane by the fingers such as 25 of the pneumatic units such as 24. Valve 92 is then actuated to supply air to the upper end of unit 61 to effect the internal seizure of the funnel by its neck, thus permitting the retraction of the fingers such as 25 as in panel coating. The attendant can then, by means of crank 56, lower the funnel to coat its sealing surface in the same fashion as in coating a panel sealing surface. With the funnel raised to its elevated position it can be seized as is a panel and released from the chuck jaws by operating valve 92 to move the piston rod 62 upward to its initial position.

Although the particular composition of the frit suspension employed has no bearing on the invention, such composition ordinarily comprises ground thermal setting sealing glass maintained in suspension in a vehicle of nitrocellulose in an amyl acetate solution.

What is claimed is:

1. In an article coating apparatus, a container for coating material having a top opening of the general outline of the article surface to be coated, a first means associated with the apparatus for temporarily supporting an article with its surface to be coated in a horizontal plane over such opening, vertically movable means for seizing such temporarily supported article in regions above the surfaces thereof to be coated and for maintaining the article in a position in which such surface is maintained in a horizontal plane independently of said first means, means for disabling said first means, and means for thereafter actuating said vertically movable means to lower such article into such opening and into engagement with a body of coating material and for elevating the article to disengage it from such body.

2. Apparatus such as defined by claim 1 wherein said first means comprises a plurality of fluid operated article support fingers.

3. Apparatus such as defined by claim 1 wherein said vertically movable means comprises chuck jaws between which the article is seized.

4. Apparatus such as defined by claim 1 wherein said vertically movable means comprises a plurality of sets of chucks for seizure of the article via exterior surfaces thereof.

5. Apparatus such as defined by claim 1 wherein said vertically movable means comprises an expanding type chuck for seizing the article by engagement with the interior surfaces of the supported article.

6. Apparatus such as defined by claim 5 wherein said expanding chuck is provided with fluid operating means.

7. In an article coating apparatus, a support, a container arranged on said support having a top opening of endless outline, means within said container movable along an endless path below the top opening to maintain fluid therein agitated, supports for an article to be coated arranged over such top opening, chuck jaws between which a supported article arranged over said top opening may be seized, means for activating certain of said jaws to seize the article, means for disabling said supports, and means for thereafter lowering said jaws to lower such article into contact with a coating fluid within said container and for thereafter elevating it to its initial position.

8. In a coating apparatus, a coating fluid container having a top opening, means associated with such apparatus for temporarily supporting an article to be coated over such top opening in a plane parallel to the top surface of a fluid within said container, means for seizing and maintaining the article in planes parallel to the top surface of such fluid, means for moving said first means out of a vertical path of travel for the article, and means for thereafter moving the seized article vertically into and out of such coating fluid.

9. In an article coating apparatus, a vertically movable support, a pair of vertically disposed laterally spaced rods fixed at their lower ends to said support, means carried by said rods for seizing an article therebetween to be lowered into a coating material, a third rod vertically arranged on said support and vertically movable with respect thereto, means associated with the top end of said third rod for seizing internally an article to be lowered into a coating material, upon the movement of said third rod with respect to said support and means operable to vertically move said support.

References Cited in the file of this patent

UNITED STATES PATENTS

| | | |
|---|---|---|
| 632,031 | Uehling | Aug. 29, 1899 |
| 1,236,832 | Frye | Aug. 14, 1917 |
| 2,054,739 | Colegrove | Sept. 15, 1936 |
| 2,164,093 | Soubier | June 27, 1939 |
| 2,244,765 | Christensen et al. | June 10, 1941 |
| 2,709,414 | Powell | May 31, 1955 |
| 2,731,947 | Harder | Jan. 24, 1956 |
| 2,792,810 | MacOneghy et al. | May 21, 1957 |
| 2,822,777 | Colchagoff | Feb. 11, 1958 |